(12) United States Patent
Townsend et al.

(10) Patent No.: US 11,370,940 B2
(45) Date of Patent: Jun. 28, 2022

(54) ADHESIVE ARTICLE AND METHODS OF MAKING AND USING THE SAME

(71) Applicant: 3M INNOVATIVE PROPERTIES COMPANY, St. Paul, MN (US)

(72) Inventors: Erik M. Townsend, Hastings, MN (US); Shantanu R. Ranade, Woodbury, MN (US); William H. Moser, Edina, MN (US); Kathleen S. Shafer, Woodbury, MN (US); Michael A. Kropp, Cottage Grove, MN (US); Jayshree Seth, Woodbury, MN (US); Ross E. Behling, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 22 days.

(21) Appl. No.: 16/615,477

(22) PCT Filed: May 16, 2018

(86) PCT No.: PCT/IB2018/053430
§ 371 (c)(1),
(2) Date: Nov. 21, 2019

(87) PCT Pub. No.: WO2018/215889
PCT Pub. Date: Nov. 29, 2018

(65) Prior Publication Data
US 2021/0277283 A1 Sep. 9, 2021

Related U.S. Application Data

(60) Provisional application No. 62/510,363, filed on May 24, 2017.

(51) Int. Cl.
*C09J 4/00* (2006.01)
*C09J 7/40* (2018.01)
(Continued)

(52) U.S. Cl.
CPC .................. *C09J 4/00* (2013.01); *C08F 4/40* (2013.01); *C08F 220/18* (2013.01);
(Continued)

(58) Field of Classification Search
CPC .......... C09J 4/00; C09J 7/40; C09J 2301/416; C09J 2301/124; C09J 2301/408;
(Continued)

(56) References Cited

U.S. PATENT DOCUMENTS

| 2,801,185 A | 7/1957 | Iler |
| 3,496,250 A | 2/1970 | Czerwinski |

(Continued)

FOREIGN PATENT DOCUMENTS

| CN | 86103398 A | * 12/1986 | ........... C07D 307/62 |
| CN | 86103398 A | 12/1986 | |

(Continued)

OTHER PUBLICATIONS

Klan, "Photoremovable Protecting Groups in Chemistry and Biology: Reaction Mechanisms and Efficacy," Chemical Reviews, 2013, vol. 113, pp. 119-191.

(Continued)

*Primary Examiner* — Michael M. Bernshteyn
(74) *Attorney, Agent, or Firm* — Bradford B. Wright

(57) ABSTRACT

An adhesive article comprising first and second tacky latent adhesive layers disposed on respective first and second opposed major surfaces of a substrate. Each of the first and second tacky latent adhesive layers independently comprises at least one polymerizable component, and a redox initiator system comprising a transition metal complex that participates in a redox cycle, an oxidizing agent, and a blocked reducing agent represented by the formula ((I). Each of $R^1$ and $R^2$ are independently H, an alkyl, an aryl, or RPhoto5

(Continued)

with the proviso that at least one of R1 and $R^2$ is RPhoto. $R^{Photo}$ represents a photoremovable group. Each of $R^3$ and $R^4$ independently represents H, an alkyl group, or an aryl group comprising a monovalent ester, ether, urethane, or carbonate group. Methods of making and using the adhesive articles are also disclosed.

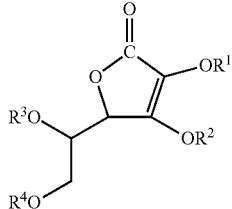

20 Claims, 1 Drawing Sheet

(51) Int. Cl.
  *C08F 4/40* (2006.01)
  *C08F 220/18* (2006.01)
  *C08K 5/15* (2006.01)
  *C08K 5/1565* (2006.01)

(52) U.S. Cl.
  CPC ............ *C08K 5/1565* (2013.01); *C09J 7/40* (2018.01); *C09J 2301/124* (2020.08); *C09J 2301/408* (2020.08); *C09J 2301/416* (2020.08); *C09J 2433/006* (2013.01)

(58) Field of Classification Search
  CPC ..... C09J 2433/006; C08F 4/40; C08F 220/18; C08K 5/1565
  USPC ...................................... 428/941.8
  See application file for complete search history.

(56) References Cited

U.S. PATENT DOCUMENTS

| | | | |
|---|---|---|---|
| 4,503,169 A | 3/1985 | Randklev | |
| 4,522,958 A | 6/1985 | Das | |
| 4,780,549 A | 10/1988 | Terao et al. | |
| 4,895,745 A | 1/1990 | Vesley | |
| 5,252,694 A * | 10/1993 | Willett | C08G 59/68 522/18 |
| 6,136,384 A | 10/2000 | Karim et al. | |
| 6,284,360 B1 | 9/2001 | Johnson et al. | |
| 6,323,251 B1 | 11/2001 | Perez et al. | |
| 6,586,483 B2 | 7/2003 | Kolb | |
| 6,864,322 B2 | 3/2005 | Gehlsen et al. | |
| 7,074,839 B2 | 7/2006 | Fansler | |
| 7,090,721 B2 | 8/2006 | Craig | |
| 7,090,722 B2 | 8/2006 | Budd | |
| 7,156,911 B2 | 1/2007 | Kangas | |
| 7,342,047 B2 * | 3/2008 | Lewandowski | A61L 15/24 514/772.3 |
| 7,598,298 B2 | 10/2009 | Lewandowski | |
| 7,649,029 B2 | 1/2010 | Kolb | |
| 9,080,084 B2 * | 7/2015 | Konarski | C09J 133/14 |
| 10,617,607 B2 * | 4/2020 | Moser | A61K 6/71 |
| 2002/0182955 A1 | 12/2002 | Weglewski et al. | |
| 2006/0264573 A1 | 11/2006 | Bennett et al. | |
| 2012/0059127 A1 | 3/2012 | Ha et al. | |
| 2016/0096980 A1 | 4/2016 | Wieneke et al. | |

FOREIGN PATENT DOCUMENTS

| | | | | |
|---|---|---|---|---|
| CN | 101175829 A | | 5/2008 | |
| CN | 101555390 A | | 10/2009 | |
| CN | 102181115 A | | 9/2011 | |
| CN | 103702659 A | | 4/2014 | |
| CN | 104837938 A | | 8/2015 | |
| CN | 106318255 A | | 1/2017 | |
| EP | 202589 A | * | 11/1986 | ........... C07D 307/62 |
| EP | 0202589 A2 | | 11/1986 | |
| EP | 1 026 218 A1 | | 8/2000 | |
| EP | 2 886 620 A1 | | 6/2015 | |
| EP | 2957577 | | 12/2015 | |
| EP | 2957577 A1 | * | 12/2015 | ........... C08F 220/10 |
| JP | 2004-189799 | | 7/2004 | |
| JP | 2009-108274 | | 5/2009 | |
| JP | 2016-183351 | | 10/2016 | |
| KR | 1994-0000073 B1 | | 1/1994 | |
| KR | 19940000073 B1 | * | 7/1994 | ........... C07D 307/62 |
| WO | WO 2013-015917 | | 1/2013 | |
| WO | WO-2013015917 A2 | * | 1/2013 | ............... C08F 2/50 |
| WO | WO 2016/007453 | | 1/2016 | |
| WO | WO 2016/195970 | | 12/2016 | |
| WO | WO 2017-078883 | | 5/2017 | |
| WO | WO 2017-079189 | | 5/2017 | |
| WO | WO-2017079189 A1 | * | 5/2017 | ........... A61K 6/0017 |
| WO | WO 2017-095704 | | 6/2017 | |
| WO | WO 2017-117163 | | 7/2017 | |
| WO | WO 2018/102198 | | 6/2018 | |

OTHER PUBLICATIONS

Matyjaszewski, "Atom Transfer Radical Polymerization," Chemical Reviews, 2001, vol. 101, pp. 2921-2990.

Wirz, "Photoremovable Protecting Groups: Reaction Mechanisms and Applications," Photochemical and Photobiological Sciences, 2002, vol. 1, pp. 441-458.

International Search Report for PCT International Application No. PCT/IB2018/053430, dated Jul. 19, 2018, 5 pages.

* cited by examiner

ADHESIVE ARTICLE AND METHODS OF MAKING AND USING THE SAME

TECHNICAL FIELD

The present disclosure broadly relates to adhesive articles, methods of making them, and methods of using them.

BACKGROUND

High-strength bonding tapes have been in the commercial marketplace for many years. These tapes typically have aggressively adhesive layers of pressure-sensitive adhesive on opposite sides of a film or foam core.

For example, 3M VHB adhesive tapes and sheets marketed by 3M Company, Saint Paul, Minn., are a family of high-strength pressure-sensitive double-sided adhesive articles that allow for rapid, long-term bonding to a variety of surfaces under a variety of conditions. The VHB family includes the 4900, 5900, and RP series of high-strength tapes. Typically, VHB tapes and sheets are composed of an acrylic foam adhesive with a liner on one or both sides.

Adhesive articles of this type have aggressive adhesion to many substrates and may require precise initial placement of the tape, without removal and repositioning capability.

SUMMARY

Advantageously, adhesive articles according to the present disclosure typically exhibit an extended open time after exposure to actinic radiation in which relatively low initial adhesion to a substrate may permit removal and repositioning of the adhesive article, followed by increasing adhesion over time until a high level of adhesion is eventually achieved.

In a first aspect, the present disclosure provides an adhesive article comprising:
a substrate having first and second opposed major surfaces;
first and second tacky latent adhesive layers disposed on the respective first and second opposed major surfaces of the substrate, wherein each of the first and second tacky latent adhesive layers independently comprises:
at least one polymerizable component, and
a redox initiator system comprising:
a transition metal complex that participates in a redox cycle;
an oxidizing agent; and
a blocked reducing agent represented by the formula

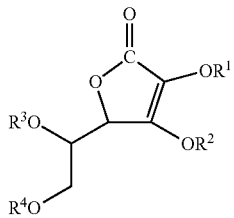

wherein
each of $R^1$ and $R^2$ are independently H, an alkyl, an aryl, or $R^{Photo}$, with the proviso that at least one of $R^1$ and $R^2$ is $R^{Photo}$;
$R^{Photo}$ represents a photoremovable group;

each of $R^3$ and $R^4$ independently represents H, an alkyl group, or an aryl group comprising a monovalent ester, ether, urethane, or carbonate group.

Adhesive articles according to the present disclosure may be tapes, sheets, or gaskets, for example.

In a second aspect, the present disclosure provides a method of making an adhesive article, the method comprising:
disposing first and second tacky latent adhesive layers on respective first and second opposed major surfaces of a substrate, wherein the first and second tacky latent adhesive layers independently comprise:
at least one polymerizable component, and
a redox initiator system comprising:
a transition metal complex that participates in a redox cycle;
an oxidizing agent; and
a blocked reducing agent represented by the formula

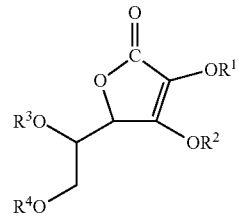

wherein
each of $R^1$ and $R^2$ are independently H, an alkyl, an aryl, or $R^{Photo}$, with the proviso that at least one of $R^1$ and $R^2$ is $R^{Photo}$;
$R^{Photo}$ represents a photoremovable group;
each of $R^3$ and $R^4$ independently represents H, an alkyl group, or an aryl group comprising a monovalent ester, ether, urethane, or carbonate group.

In yet another aspect, the present disclosure provides a method of using an adhesive article according to the present disclosure, the method comprising:
exposing the first and second tacky latent adhesive layers to actinic electromagnetic radiation to provide exposed first and second tacky latent adhesive layers; and
contacting the exposed first and second tacky latent adhesive layer with respective first and second adherends.

As used herein:
the term "actinic radiation" means electromagnetic radiation of wavelength(s) capable of being absorbed by a composition exposed to it and thereby cause at least one chemical reaction or transformation to occur;
the term "blocked reducing agent" means a compound that does not function as a reducing agent until a blocking group is removed;
the term "(meth)acryl" refers to "acryl and/or methacryl"; and
the term "photoremovable group" means a group that can be removed by exposure to actinic radiation, optionally with one or more subsequent chemical steps.

Features and advantages of the present disclosure will be further understood upon consideration of the detailed description as well as the appended claims.

The disclosure may be more completely understood in consideration of the following detailed description of various embodiments of the disclosure in connection with the accompanying figure. It should be understood that numerous other modifications and embodiments can be devised by those skilled in the art, which fall within the scope and spirit of the principles of the disclosure. The figure may not be drawn to scale.

DETAILED DESCRIPTION

Figure 1:
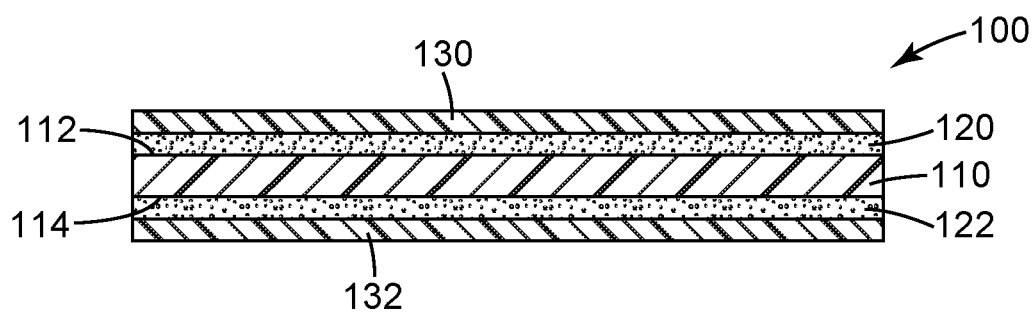
FIG. 1 is a schematic side view of an exemplary adhesive article 100 according to one embodiment of the present disclosure.

Referring now to FIG. 1, exemplary adhesive article 100 comprises substrate 110 having first major surface 112. First tacky latent adhesive layer 120 is disposed on first major surface 112. Optional first release liner 130 is releasably adhered to first tacky latent adhesive layer 120 opposite substrate 110. Second tacky latent adhesive layer 122 is disposed on second major surface 114 opposite first major surface 112. Optional second release liner 132 is releasably adhered to second tacky latent adhesive layer 122.

Figure 2:
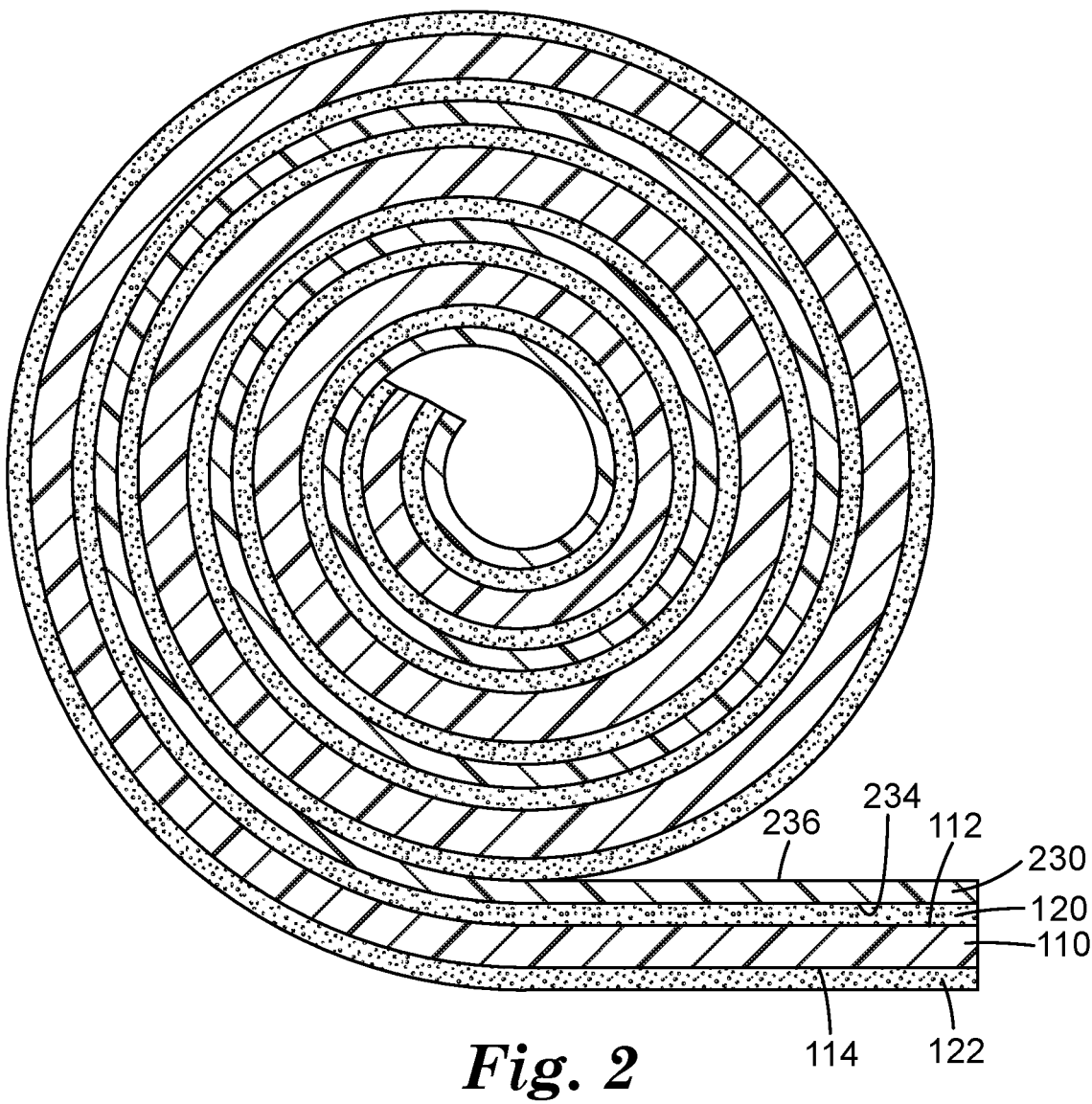
FIG. 2 is a schematic side view of an exemplary adhesive article 200 according to another embodiment of the present disclosure.

Referring now to FIG. 2, an alternative exemplary adhesive article 200 comprises substrate 110 having first major surface 112. First tacky latent adhesive layer 120 is disposed on first major surface 112. First major surface 234 of release liner 230 is releasably adhered to first tacky latent adhesive layer 120 opposite substrate 110. Second tacky latent adhesive layer 122 is disposed on second major surface 114 opposite first major surface 112. Second major surface 236 of release liner 230 is releasably adhered to second tacky latent adhesive layer 122. In this embodiment, the second major surface 236/second tacky latent adhesive layer 122 bond is typically stronger than the first major surface 234/first tacky latent adhesive layer 120 bond in order to permit a clean unwind.

The first and second tacky latent adhesive layers comprise at least one polymerizable component and a redox free-radical initiator system that includes a transition metal complex that participates in a redox cycle with the oxidizing agent and the reducing agent (after deblocking/photoremoving the blocking group), an oxidizing agent, and a blocked reducing agent of general formula I, below:

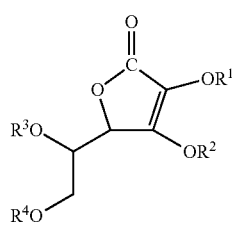
(I)

wherein:
each of $R^1$ and $R^2$ is independently H, alkyl, aryl, or $R^{Photo}$, with the proviso that at least one of $R^1$ and $R^2$ is $R^{Photo}$;
$R^{Photo}$ is a photoremovable group; and
each of $R^3$ and $R^4$ independently represents H, an alkyl group, or an aryl group comprising at least one of ester, ether, urethane, or carbonate functionality. For example, $R^3$ and $R^4$ may be alkyl-NHC(=O)—, alkyl-O—, or aryl-C(=O)—O—.

In some embodiments, $R^3$ and $R^4$ may be taken together to form a five- or six-membered ring, such as by forming a ketal or acetal group. In some preferred embodiments, at least one of $R^3$ and $R^4$ comprises a $C_{12}$-$C_{30}$ alkyl chain included with ester, ether, urethane, or carbonate functionality to confer solubility and/or miscibility of the reducing agent in the polymerizable component(s).

Any photoremovable group that cleaves or fragments to release the reducing agent upon exposure to actinic electromagnetic radiation may be used. For example, reference is made to Petr Klan et al., Photoremovable Protecting Groups in Chemistry and Biology: Reaction Mechanisms and Efficiency, *Chemical Reviews*, 2013, vol. 113, pp. 119-191 and Jacob Wirz et al., Photoremovable Protecting Groups: Reaction Mechanisms and Applications, *Photochemical and Photobiological Sciences*, 2002, vol. 1, pp. 441-458.

With reference to Formula I, useful photoremovable groups $R^{Photo}$ include, but are not limited to, phenacyl groups, 2-alkylphenacyl groups, ethylene-bridged phenacyl groups, o- or p-hydroxyphenacyl groups, benzoin groups, o-nitrobenzyl groups, o-nitro-2-phenethyloxycarbonyl groups, coumarin-4-yl-methyl groups, benzyl groups, o-hydroxylbenzyl groups, o-hydroxynaphthyl groups, 2,5-dihydroxybenzyl groups, 9-phenylthioxanthyl, 9-phenylxanthyl groups, anthraquinon-2-yl groups, 8-halo-7-hydroxyquinoline-2-yl-methyl groups, and O,O-pivaloyl glycol groups.

Blocked reducing agents of Formula I may be prepared, for example, by alkylating the hydroxyl groups corresponding to $R^3$ and $R^4$ being hydrogen, typically by forming an acetal or ketal, followed by functionalizing at $R^1$ and/or $R^2$ with the photoremovable group. As the hydroxyl group corresponding to $R^2$ is the most acidic, it is preferentially functionalized.

Exemplary useful transition metal complexes have general formula II, below:

M represents a transition metal capable of participating in a redox cycle with the oxidizing agent and the reducing agent. Useful transition metals, M, may include the catalytically active valent states of Cu, Fe, Ru, Cr, Mo, Pd, Ni, Pt, Mn, Rh, Re, Co, V, Au, Nb and Ag. Preferred, low valent transition metals include Cu(II), Fe(II), Ru(II), and Co(II). Other valent states of these metals may be used, and the active low valent state generated in situ.

L represents a ligand. The ligand, L, may be used to solubilize the transition metal salts in a suitable solvent and adjust the redox potential of the transition metal for appropriate reactivity and selectivity. The ligands can direct the transition metal complex to undergo a desired one-electron transfer process, rather than a two-electron process such as oxidative addition/reductive elimination. The ligands may further enhance the stability of the complexes in the presence of different monomers and solvents or at different temperatures. Acidic monomers and monomers that strongly complex transition metals may still be efficiently polymerized by appropriate selection of ligands.

Useful ligands may include those having one or more nitrogen, oxygen, phosphorus and/or sulfur atoms which can coordinate to the transition metal through a σ-bond, ligands containing two or more carbon atoms which can coordinate to the transition metal through a π-bond, and ligands which can coordinate to the transition metal through a µ-bond or an η-bond.

Such ligands may be monodentate or polydentate compounds, preferably containing up to about carbon atoms and up to 10 heteroatoms selected from aluminum, boron, nitrogen, sulfur, non-peroxidic oxygen, phosphorus, arsenic, selenium, antimony, and tellurium, where upon addition to the metal atom, following loss of zero, one, or two hydrogens, the polydentate compounds preferably forming with the metal, $M^{n+}$, a 4-, 5-, or 6-membered saturated or unsaturated ring. Examples of suitable monodentate ligands are carbon monoxide; alcohols such as ethanol, butanol, and phenol; pyridine, nitrosonium (i.e., $NO^+$); compounds of Group 15 elements such as ammonia, phosphine, trimethylamine, trimethylphosphine, tributylphosphine, triphenylamine, triphenylphosphine, triphenylarsine, or tributyl phosphite; nitriles such as acetonitrile or benzonitrile; isonitriles such as phenylisonitrile or butylisonitrile; carbene groups such as ethoxymethylcarbene or dithiomethoxycarbene; alkylidenes such as methylidene or ethylidene.

Exemplary suitable polydentate compounds or groups include dipyridyl; 1,2-bis(diphenyl-phosphino)ethane: 1,2-bis(diphenylarsino)ethane; bis(diphenylphosphino)methane; polyamines such as ethylenediamine, propylenediamine, tetramethylethylenediamine, hexamethyl tris-aminoethylamine, diethylenetriamine, 1,3-diisocyanopropane, and hydridotripyrazolylborate; hydroxycarboxylic acids such as glycolic acid, lactic acid, salicylic acid; polyhydric phenols such as catechol and 2,2'-dihydroxybiphenyl; hydroxyamines such as ethanolamine, propanolamine, and 2-aminophenol; dithiocarbamates such as diethyldithiocarbamate, dibenzyldithiocarbamate; xanthates such as ethyl xanthate, phenyl xanthate; the dithiolenes such as bis(perfluoromethyl)-1,2-dithiolene; aminocarboxylic acids such as alanine, glycine and o-aminobenzoic acid; dicarboxylic diamines as oxalamide, biuret; diketones such as 2,4-pentanedione; hydroxyketones such as 2-hydroxyacetophenone; α-hydroxyoximes such as salicylaldoxime; ketoximes such as benzil oxime; 1,10-phenanthroline; porphyrins; cryptands and crown ethers such as 18-crown-6 ether; and glyoximes such as dimethylglyoxime.

Other suitable ligands that can coordinate to the transition metal through a σ-bond are the inorganic groups such as, for example, $F^-$, $OH^-$, $Cl^-$, $Br^-$, $I^-$, and hydride, and organic groups such as, for example, $CN^-$, $SCN^-$, acetoxy, formyloxy, and benzoyloxy. The ligand can also be a unit of a polymer; for example the amino group in poly(ethylenimine); the phosphino group in poly(4-vinylphenyldiphenylphosphine); the carboxylic acid group in poly(acrylic acid); and the isonitrile group in poly(4-vinylphenylisonitrile).

Useful ligands containing two or more carbon atoms which can coordinate to the transition metal through a π-bond are provided by any monomeric or polymeric compound having an accessible unsaturated group, e.g., an ethylenic

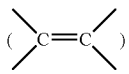

group, acetylenic (—C≡C—) group, or aromatic group which has accessible π-electrons regardless of the total molecular weight of the compound.

Exemplary π-bond ligands include the linear and cyclic ethylenic and acetylenic compounds having less than 100 carbon atoms (when monomeric), preferably having less than 60 carbon atoms, and from zero to 10 heteroatoms selected from nitrogen, sulfur, non-peroxidic oxygen, phosphorous, arsenic, selenium, boron, aluminum, antimony, tellurium, silicon, germanium, and tin, the ligands being those such as ethylene, acetylene, propylene, methylacetylene, α-butene, 2-butene, diacetylene, butadiene, 1,2-dimethylacetylene, cyclobutene, pentene, cyclopentene, hexene, cyclohexene, 1,3-cyclohexadiene, cyclopentadiene, 1,4-cyclohexadiene, cycloheptene, 1-octene, 4-octene, 3,4-dimethyl-3-hexene, and 1-decene; $\eta^3$-allyl, $\eta^3$-pentenyl, norbomadiene, $\eta^5$-cyclohexadienyl, cycloheptatriene, cyclooctatetraene, and substituted and unsubstituted carbocyclic and heterocyclic aromatic ligands having up to 25 rings and up to 100 carbon atoms and up to 10 hetero atoms selected from nitrogen, sulfur, non-peroxidic oxygen, phosphorus, arsenic, selenium, boron, aluminum, antimony, tellurium, silicon, germanium, and tin, such as, for example, $\eta^5$-cyclopentadienyl, benzene, mesitylene, toluene, xylene, tetramethylbenzene, hexamethylbenzene, fluorene, naphthalene, anthracene, chrysene, pyrene, $\eta^7$-cycloheptatrienyl, triphenylmethane, paracyclophane, 1,4-diphenylbutane, $\eta^5$-pyrrolo, $\eta^5$-thiophene, $\eta^5$-furan, pyridine, γ-picoline, quinaldine, benzopyran, thiochrome, benzoxazine, indole, acridine, carbazole, triphenylene, silabenzene, arsabenzene, stibabenzene, 2,4,6-triphenylphosphabenzene, $\eta^5$-selenophene, dibenzostannepine, $\eta^5$-tellurophene, phenothiazine, selenanthrene, phenoxaphosphine, phenarsazine, phenatellurazine, $\eta^5$-methylcyclopentadienyl, $\eta^5$-pentamethylcyclopentadienyl, and 1-phenylborabenzene. Other suitable aromatic compounds can be found by consulting any of many chemical handbooks.

Preferred ligands include unsubstituted and substituted pyridines and bipyridines, tertiary amines, including polydentate amines such as N,N,N',N'-tetramethylethylenediamine and tris(N,N-dimethylamino-ethyl)amine, acetonitrile, phosphites (e.g., $(CH_3O)_3P$), 1,10-phenanthroline, porphyrin, cryptands and crown ethers (e.g., 18-crown-6 ether). Most preferred ligands are polydentate amines, bipyridine, and phosphites. Ligands and ligand-metal complexes useful in the initiator systems of the present invention are described in Matyjaszewski and Xia, *Chemical Reviews*, 2001, vol. 101, pp. 2921-2990.

$A^-$ represents an anion. Exemplary useful anions, $A^-$, include halide (e.g., chloride, bromide, fluoride), alkoxy groups having from 1 to 6 carbon atoms (i.e., $C_1$-$C_6$ alkoxy), nitrate, sulfate, phosphate, biphosphate, hexafluorophosphate, triflate, methanesulfonate, arenesulfonate, cyanide, alkanecarboxylates (e.g., acetate), and arenecarboxylates (e.g., benzenecarboxylate).

n represents the formal charge on the transition metal having a whole number value of 1 to 7, preferably 1 to 3, and p is the number of ligands on the transition metal having a number value of 1 to 9, preferably 1 to 2.

Some preferred transition metal complexes comprise at least one of copper (II) naphthenate or copper (II) acetate.

The molar proportion of photoremovable reducing agent (of Formula I) relative to transition metal complex is generally that which is effective to polymerize the selected polymerizable components(s), and may be, for example, from 1000:1 to 5:1, preferably from 500:1 to 25:1, more preferably from 250:1 to 50:1, and even more preferably from 200:1 to 75:1. The oxidant and photodeblockable reducing agent of the redox initiator system are used in approximately equimolar amount. Generally, the mole ratio of the oxidant and photodeblockable reducing agent is from 1:1.5 to 1.5:1, preferably 1:1.1 to 1.1 to 1, although this is not a requirement.

Suitable oxidizing agents will also be familiar to those skilled in the art, and include, but are not limited to, persulfuric acid and salts thereof, such as sodium, potassium, ammonium, cesium, and alkyl ammonium salts. Preferred oxidizing agents include: peroxides such as benzoyl peroxides; hydroperoxides such as cumyl hydroperoxide, t-butyl hydroperoxide, and amyl hydroperoxide; and salts of transition metals such as cobalt (III) chloride and ferric chloride, cerium (IV) sulfate, perboric acid and salts thereof, permanganic acid and salts thereof, perphosphoric acid and salts thereof, and combinations thereof.

The reducing and oxidizing agents are preferably present in amounts sufficient to permit an adequate free-radical reaction rate. This can be evaluated by combining all of the ingredients of the polymerizable composition, except for the optional filler, and observing whether or not a hardened mass is obtained after exposure to actinic electromagnetic radiation.

Preferably, the blocked reducing agent is present in an amount of at least 0.01 part by weight, and more preferably at least 0.1 parts by weight, based on the total weight of the monomer components of the polymerizable composition. Preferably, the reducing agent is present in an amount of no greater than 10 parts by weight, and more preferably no greater than 5 parts by weight, based on the total weight of the polymerizable components of the polymerizable composition.

Preferably, the oxidizing agent is present in an amount of at least 0.01 part by weight, and more preferably at least 0.10 part by weight, based on the total weight of the polymerizable components of the polymerizable composition. Preferably, the oxidizing agent is present in an amount of no greater than 10 parts by weight, and more preferably no greater than 5 parts by weight, based on the total weight of the polymerizable components of the polymerizable composition.

The present disclosure further provides a polymerizable composition comprising the redox initiator system (including transition metal complex, oxidant and photodeblockable reducing agent (e.g., having a photoremovable group that is lost to generate a reducing agent)), and at least one polymerizable component monomer, such as vinyl monomers, and (meth)acryloyl monomers (including acrylate esters, amides, and acids to produce (meth)acrylate homo- and copolymers). The redox initiator system is present in the composition in amounts, from about 0.1 to about 10 parts by weight, preferably 0.1 to 5 parts by weight, based on 100 parts by weight of the polymerizable component of the polymerizable composition.

In some embodiments, the polymerizable composition comprises the redox initiator system and one or more vinyl monomers. Vinyl monomers useful in the polymerizable composition include vinyl ethers (e.g., methyl vinyl ether, ethyl vinyl ether), vinyl esters (e.g., vinyl acetate and vinyl propionate), styrene, substituted styrenes (e.g., α-methylstyrene), vinyl halide, divinylbenzene, alkenes (e.g., propylene, isomers of butylene, pentene, hexylene up to dodecene, isoprene, and/or butadiene), and combinations thereof.

In some embodiments the polymerizable composition comprises one or more (meth)acrylate ester monomer(s). (Meth)acrylate ester monomers useful in preparing (meth)acrylate (co)polymers are monomeric (meth)acrylic esters of non-tertiary alcohols, which alcohols contain from 1 to 14 carbon atoms, and preferably from 4 to 12 carbon atoms.

Exemplary monomers suitable for use as (meth)acrylate ester monomers include the esters of (meth)acrylic acid with non-tertiary alcohols such as ethanol, 1-propanol, 2-propanol, 1-butanol, 2-butanol, 1-pentanol, 2-pentanol, 3-pentanol, 2-methyl-1-butanol, 3-methyl-1-butanol, 1-hexanol, 2-hexanol, 2-methyl-1-pentanol, 3-methyl-1-pentanol, 2-ethyl-1-butanol, 3,5,5-trimethyl-1-hexanol, 3-heptanol, 1-octanol, 2-octanol, isooctyl alcohol, 2-ethyl-1-hexanol, 1-decanol, 2-propylheptanol, 1-dodecanol, 1-tridecanol, 1-tetradecanol, citronellol, and dihydrocitronellol. In some embodiments, the (meth)acrylate ester monomer is an ester of (meth)acrylic acid with butyl alcohol or isooctyl alcohol, or a combination thereof, although combinations of two or more different (meth)acrylate ester monomers are suitable. In some embodiments, the (meth)acrylate ester monomer is an ester of (meth)acrylic acid with an alcohol derived from a renewable source, such as 2-octanol, citronellol, or dihydrocitronellol.

In some embodiments it is desirable for the (meth)acrylic acid ester monomer to include a high $T_g$ (i.e., glass transition temperature) monomer. The homopolymers of these high $T_g$ monomers have a $T_g$ of at least 25° C., and preferably at least 50° C. Examples of suitable monomers useful in the present invention include t-butyl acrylate, methyl methacrylate, ethyl methacrylate, isopropyl methacrylate, n-butyl methacrylate, isobutyl methacrylate, s-butyl methacrylate, t-butyl methacrylate, stearyl methacrylate, phenyl methacrylate, cyclohexyl methacrylate, isobornyl acrylate, isobornyl methacrylate, benzyl methacrylate, 3,3,5-trimethylcyclohexyl acrylate, cyclohexyl acrylate, N-octylacrylamide, propyl methacrylate, and combinations thereof.

(Meth)acrylate ester monomer may be present in an amount of up to 100 parts by weight, preferably 85 to 99.5 parts by weight based on 100 parts total monomer content used to prepare the polymer, exclusive of the amount of multifunctional (meth)acrylates. Preferably, (meth)acrylate ester monomer is present in an amount of 90 to 95 parts by weight based on 100 parts total monomer content. When high $T_g$ monomers are included, the copolymer may include up to 50 parts by weight, preferably up to 20 parts by weight of the (meth)acrylate ester monomer component.

The polymerizable composition may comprise an acid-functional monomer, where the acid-functional group may be an acid per se such as a carboxylic acid, or a portion may be a salt thereof, such as an alkali metal carboxylate. Useful acid-functional monomers include, but are not limited to, those selected from ethylenically-unsaturated carboxylic acids, ethylenically-unsaturated sulfonic acids, ethylenically-unsaturated phosphonic or phosphoric acids, and combinations thereof. Examples of such compounds include those selected from acrylic acid, methacrylic acid, itaconic acid, fumaric acid, crotonic acid, citraconic acid, maleic acid, oleic acid, β-carboxyethyl (meth)acrylate, 2-sulfoethyl methacrylate, styrene sulfonic acid, 2-acrylamido-2-methylpropanesulfonic acid, vinylphosphonic acid, and combinations thereof.

Due to their availability, acid-functional monomers of the acid-functional copolymer are generally selected from ethylenically-unsaturated carboxylic acids, e.g., (meth)acrylic acids. When even stronger acids are desired, acidic monomers include the ethylenically-unsaturated sulfonic acids and ethylenically-unsaturated phosphonic acids. The acid-functional monomer is generally used in amounts of 0.5 to 15 parts by weight, preferably 1 to 15 parts by weight, most preferably 5 to 10 parts by weight, based on 100 parts by weight total monomer.

The polymerizable composition may comprise a polar monomer. The polar monomers useful in preparing the copolymer are both somewhat oil soluble and water soluble, resulting in a distribution of the polar monomer between the aqueous and oil phases in an emulsion polymerization. As used herein the term "polar monomers" is exclusive of acid-functional monomers.

Representative examples of suitable polar monomers include 2-hydroxyethyl (meth)acrylate; N-vinylpyrrolidone; N-vinylcaprolactam; acrylamide; mono- or di-N-alkyl substituted acrylamides; N-t-butylacrylamide; dimethylaminoethylacrylamide; N-octyl acrylamide; tetrahydrofurfuryl (meth)acrylate; poly(alkoxyalkyl) (meth)acrylates including 2-(2-ethoxyethoxy)ethyl (meth)acrylate; 2-ethoxyethyl (meth)acrylate; 2-methoxyethoxyethyl (meth)acrylate; 2-methoxyethyl methacrylate; polyethylene glycol mono (meth)acrylates; alkyl vinyl ethers, including vinyl methyl ether; and combinations thereof. Preferred polar monomers include those selected from the group consisting of tetrahydrofurfuryl (meth)acrylate, 2-hydroxyethyl (meth)acrylate and N-vinylpyrrolidone. The polar monomer may be present, for example, in amounts of 0 to 10 parts by weight, preferably 0.5 to 5 parts by weight, based on 100 parts by weight total monomer.

The polymerizable composition may further comprise a vinyl monomer when preparing acrylic copolymers. When used, vinyl monomers useful in the (meth)acrylate polymer include vinyl esters (e.g., vinyl acetate and vinyl propionate), styrene, substituted styrene (e.g., α-methyl styrene), vinyl halide, divinylbenzene, and combinations thereof. As used herein, vinyl monomers are exclusive of acid-functional monomers, acrylate ester monomers, and polar monomers. Such vinyl monomers are generally used at 0 to 5 parts by weight, preferably 1 to 5 parts by weight, based on 100 parts by weight total monomer when preparing acrylic copolymers.

A multifunctional (meth)acrylate may be incorporated into the blend of polymerizable monomers. Examples of useful multifunctional (meth)acrylates include, but are not limited to, di(meth)acrylates, tri(meth)acrylates, and tetra (meth)acrylates, such as 1,6-hexanediol di(meth)acrylate, polyethylene glycol di(meth)acrylates, polybutadiene di(meth)acrylate, polyurethane di(meth)acrylates, and propoxylated glycerin tri(meth)acrylate, and combinations thereof. The amount and identity of multifunctional (meth) acrylate is tailored depending upon application of the adhesive composition.

Typically, the multifunctional (meth)acrylate is present in amounts up to 100 parts, preferably 0.1 to 100 parts, based 100 parts by weight of remaining polymerizable monofunctional monomers. In some embodiments the multifunctional (meth)acrylate is used in amounts of greater than 50 parts by weight, based on the 100 parts by weight of remaining polymerizable monomers. In some embodiments, the multifunctional (meth)acrylate may be present in amounts from 0.01 to 5 parts, preferably 0.05 to 1 parts, based on 100 parts total monomers of the polymerizable composition.

In such embodiments, an acrylic copolymer may be prepared from a polymerizable composition comprising:
  a) up to 100 parts by weight, preferably 85 to 99.5 parts by weight of (meth)acrylic acid ester;
  b) 0 to 15 parts by weight of acid-functional ethylenically-unsaturated monomer;
  c) 0 to 15 parts by weight of non-acid-functional, ethylenically-unsaturated polar monomer;
  d) 0 to 5 parts by weight of vinyl monomer;
  e) 0 to 100 parts by weight of multifunctional (meth) acrylate, preferably 50 to 100 parts by weight, relative to 100 total parts of components a) to d); and
  f) a redox initiator system (including the transition metal complex, oxidant and photoremovable reducing agent) in amounts from about 0.1 weight percent to about 5.0 weight percent, relative to 100 total parts of components a) to e).

The polymerizable composition may also include other additives. Examples of suitable additives include tackifiers (e.g., rosin esters, terpenes, phenols, and aliphatic, aromatic, or mixtures of aliphatic and aromatic synthetic hydrocarbon resins), surfactants, plasticizers (other than physical blowing agents), nucleating agents (e.g., talc, silica, or $TiO_2$), pigments, dyes, reinforcing agents, solid fillers, stabilizers (e.g., UV stabilizers), non-reactive film-forming oligomers and/or polymers, and combinations thereof. The additives may be added in amounts sufficient to obtain the desired properties for the cured composition being produced. The desired properties are largely dictated by the intended application of the resultant polymeric article.

Adjuvants may optionally be added to the compositions such as colorants, abrasive granules, anti-oxidant stabilizers, thermal degradation stabilizers, light stabilizers, conductive particles, tackifiers, flow agents, film-forming polymers, bodying agents, flatting agents, inert fillers, binders, blowing agents, fungicides, bactericides, surfactants, plasticizers, rubber tougheners and other additives known to those skilled in the art. They also can be substantially unreactive, such as fillers, both inorganic and organic. These adjuvants, if present, are preferably added in an amount effective for their intended purpose.

In some embodiments, a toughening agent may be used. The toughening agents which are useful in the present invention are polymeric compounds having both a rubbery phase and a thermoplastic phase such as: graft polymers having a polymerized, diene, rubbery core and a poly(meth) acrylate shell; graft polymers having a rubbery, poly(meth) acrylate core with a poly(meth)acrylate shell; and elastomeric particles polymerized in situ in the epoxide from free radical polymerizable monomers and a copolymerizable polymeric stabilizer.

Examples of useful toughening agents of the first type include graft copolymers having a polymerized diene rubbery backbone or core to which is grafted a shell of an acrylic acid ester or methacrylic acid ester, monovinyl aromatic hydrocarbon, or a mixture thereof, such as disclosed in U.S. Pat. No. 3,496,250 (Czerwinski). Preferable rubbery backbones comprise polymerized butadiene or a polymerized mixture of butadiene and styrene. Preferable shells comprising polymerized methacrylic acid esters are lower alkyl ($C_1$-$C_4$) substituted methacrylates. Preferable monovinyl aromatic hydrocarbons are styrene, α-methylstyrene, vinyltoluene, vinylxylene, ethylvinylbenzene, isopropylstyrene, chlorostyrene, dichlorostyrene, and ethylchlorostyrene. It is important that the graft copolymer contain no functional groups that would poison the catalyst.

Examples of useful toughening agents of the second type are acrylate core-shell graft copolymers wherein the core or backbone is a polyacrylate polymer having a glass transition temperature below about 0° C., such as polybutyl acrylate or polyisooctyl acrylate to which is grafted a polymethacrylate polymer (shell) having a glass transition above about 25° C. such as, for example, polymethyl methacrylate. The third class of toughening agents useful in the invention comprises elastomeric particles that have a $T_g$ below about 25° C. before mixing with the other components of the composition. These elastomeric particles are polymerized from free-radically polymerizable monomers and a copolymerizable polymeric stabilizer that is soluble in the resins. The free-radically polymerizable monomers are ethylenically-unsaturated monomers or diisocyanates combined with co-reactive difunctional hydrogen compounds such as diols, diamines, and alkanolamines.

Useful toughening agents include core/shell polymers such as methacrylate-butadiene-styrene (MBS) copolymer wherein the core is crosslinked styrene/butadiene rubber and the shell is polymethyl acrylate (for example, ACRYLOID KM653 and KM680, available from Rohm and Haas, Philadelphia, Pa.), those having a core comprising polybutadiene and a shell comprising poly(methyl methacrylate) (for example, KANE ACE M511, M521, B11A, B22, B31, and M901 available from Kaneka Corporation, Houston, Ill., and CLEARSTRENGTH C223 available from ATOFINA, Philadelphia, Pa.), those having a polysiloxane core and a polyacrylate shell (for example, CLEARSTRENGTH S-2001 available from ATOFINA and GENIOPERL P22 available from Wacker-Chemie GmbH, Wacker Silicones, Munich, Germany), those having a polyacrylate core and a poly(methyl methacrylate) shell (for example, PARALOID EXL2330 available from Rohm and Haas and STAPHYLOID AC3355 and AC3395 available from Takeda Chemical Company, Osaka, Japan), those having an MBS core and a poly(methyl methacrylate) shell (for example, PARALOID EXL2691A, EXL2691, and EXL2655 available from Rohm and Haas) and the like and combinations thereof. Preferred modifiers include the above-listed ACRYLOID and PARALOID modifiers, and combinations thereof.

If present, the toughening agent is preferably used in an amount of 1-35 parts by weight, preferably 3-25 parts by weight, relative to 100 parts by weight of the polymerizable component of the polymerizable composition. The toughening agent adds strength to the composition after curing without reacting with the component of the polymerizable composition or interfering with curing.

In some embodiments the polymerizable composition may include one or more non-free radically polymerizable film-forming polymers. The term "film-forming organic polymer" refers to an organic polymer that will uniformly coalesce upon drying. Film-forming polymers suitable for use in the compositions are generally thermoplastic organic polymers.

Examples of suitable polymers include: polyesters (e.g., polyethylene terephthalate or polycaprolactone); copolyesters (e.g., polyethylene terephthalate isophthalate); polyamides (e.g., polyhexamethylene adipamide); vinyl polymers (e.g., poly(vinyl acetate/methyl acrylate) and poly (vinylidene chloride/vinyl acetate)); polyolefins (e.g., polystyrene and copolymers of styrene with acrylate(s) such as, for example, poly(styrene-co-butyl acrylate)); polydienes (e.g., poly(butadiene/styrene)); acrylic polymers (e.g., poly (methyl methacrylate-co-ethyl acrylate) and poly(methyl acrylate-co-acrylic acid)); polyurethanes (e.g., reaction products of aliphatic, cycloaliphatic or aromatic diisocyanates with polyester glycols or polyether glycols); and cellulosic derivatives (e.g., cellulose ethers such as ethyl cellulose and cellulose esters such as cellulose acetate/butyrate). Combinations of film-forming polymers may also be used. Methods and materials for preparing aqueous emulsions or latexes of such polymers are well known, and many are widely available from commercial sources.

In some embodiments the crosslinkable composition may include filler, preferably at most 30 weight percent, and more preferably at most 10 weight percent. Fillers may be selected from one or more of a wide variety of materials, as known in the art, and include organic and inorganic filler. Inorganic filler particles include silica, submicron silica, zirconia, submicron zirconia, and non-vitreous microparticles of the type described in U.S. Pat. No. 4,503,169 (Randklev). Filler components may include nanosized silica particles, nanosized metal oxide particles, and combinations thereof. Nanofillers are also described in U.S. Pat. No. 7,090,721 (Craig et al.), U.S. Pat. No. 7,090,722 (Budd et al.), U.S. Pat. No. 7,156,911 (Kangas et al.), and U.S. Pat. No. 7,649,029 (Kolb et al.).

In some embodiments the filler may be surface-modified. A variety of conventional methods are available for modifying the surface of nanoparticles including, for example, adding a surface-modifying agent to nanoparticles (e.g., in the form of a powder or a colloidal dispersion) and allowing the surface-modifying agent to react with the nanoparticles. Other useful surface-modification processes are described in U.S. Pat. No. 2,801,185 (Her), U.S. Pat. No. 4,522,958 (Das et al.), and U.S. Pat. No. 6,586,483 (Kolb et al.).

Surface-modifying groups may be derived from surface-modifying agents. Schematically, surface-modifying agents can be represented by the formula X-Y, where the X group is capable of attaching to the surface of the particle (i.e., the silanol groups of a silica particle) and the Y group is a reactive or non-reactive functional group. A non-functional group does not react with other components in the system (e.g., the substrate). Non-reactive functional groups can be selected to render the particle relatively more polar, relatively less polar or relatively non-polar. In some embodiments the non-reactive functional group Y is a hydrophilic group such as an acid group (including carboxylate, sulfonate and phosphonate groups), ammonium group or poly(oxyethylene) group, or hydroxyl group. In other embodiments, Y may be a reactive functional group such as an ethylenically-unsaturated polymerizable group, including vinyl, allyl, vinyloxy, allyloxy, and (meth)acryloyl, that may be free-radically polymerized with the polymerizable resin or monomers.

Such optional surface-modifying agents may be used in amounts such that 0 to 100%, generally 1 to 90% (if present) of the surface functional groups (Si—OH groups) of the silica nanoparticles are functionalized. The number of functional groups is experimentally determined where quantities of nanoparticles are reacted with an excess of surface modifying agent so that all available reactive sites are functionalized with a surface modifying agent. Lower percentages of functionalization may then be calculated from the result. Generally, the amount of surface modifying agent is used in amount sufficient to provide up to twice the equal weight of surface modifying agent relative to the weight of inorganic nanoparticles. When used, the weight ratio of surface modifying agent to inorganic nanoparticles is preferably 2:1 to 1:10. If surface-modified silica nanoparticles are desired, it is preferred to modify the nanoparticles prior to incorporation into the coating composition.

Useful multifunctional (meth)acrylate monomers may comprise three or more (meth)acrylate groups. If present, preferred multifunctional (meth)acrylate monomers comprising three or more (meth)acrylate groups include trimethylolpropane tri(meth)acrylate (TMPTA), pentaerythritol tri(meth)acrylate, pentaerythritol tetra(meth)acrylate, dipentaerythritol tri(meth)acrylate (Sartomer SR 355), dipentaerythritol penta(meth)acrylate (Sartomer SR 399), dipentaerythritol hydroxy penta(meth)acrylate (DPHPA), glyceryl propoxy tri(meth)acrylate, trimethylolpropane tri(meth) acrylate, and combinations thereof. Another useful radiation-curable component of the present invention is the class of multifunctional (meth)acrylate oligomers, having two or more (meth)acrylate groups, and having a weight average molecular weight ($M_w$) in the range from about 400 to 2000 grams/mole.

Useful multifunctional (meth)acrylate oligomers include polyester (meth)acrylates, polyurethane (meth)acrylates, and (meth)acrylated epoxy (meth)acrylates. (Meth)acrylated epoxy (meth)acrylates and polyester(meth)acrylates are most preferred because they tend to have a relatively low viscosity and therefore allow a more uniform layer to be applied by the spin coating method. Specifically, preferred multifunctional (meth)acrylate oligomers include those commercially available from UCB Radcure, Inc. of Smyrna, Ga. and sold under the trade name EBECRYL (Eb): Eb40 (tetrafunctional acrylated polyester oligomer), ENO (polyester tetra-functional (meth)acrylate oligomer), Eb81 (multifunctional (meth)acrylated polyester oligomer), Eb600 (bisphenol A epoxy di(meth)acrylate), Eb605 (bisphenol A epoxy di(meth)acrylate diluted with 25% tripropylene glycol di(meth)acrylate), Eb639 (novolac polyester oligomer), Eb2047 (trifunctional acrylated polyester oligomer), Eb3500 (di-functional Bisphenol-A oligomer acrylate), Eb3604 (multi-functional polyester oligomer acrylate), Eb6602 (trifunctional aromatic urethane acrylate oligomer), Eb8301 (hexafunctional aliphatic urethane acrylate), EbW2 (difunctional aliphatic urethane acrylate oligomer), and combinations thereof. Of these, the most preferred are, Eb 600, Eb605, Eb80, and Eb81.

Molecular weight may be controlled through the use of chain transfer agents and chain retarding agents, including mercaptans, disulfides, triethylsilane, carbon tetrabromide, carbon tetrachloride, α-methylstyrene and others such as are known in the art.

In some embodiments, the multifunctional (meth)acrylate oligomers may comprise a reactive oligomer having pendent polymerizable groups comprising:
a) greater than 50 parts by weight, preferably greater than 75 parts by weight, most preferably greater than 80 parts by weight of (meth)acrylate ester monomer units;
b) 1 to 10 parts by weight, preferably 1 to 5 parts by weight, most preferably 1 to 3 parts by weight, of monomer units having a pendent, free-radically polymerizable functional group,
c) 0 to 20 parts by weight of other polar monomer units, wherein the sum of the monomer units is 100 parts by weight.

Useful reactive oligomers may be represented by general formula III, below:

$$-[M^{Unsatd}]_o[M^{ester}]_p[M^{polar}]_q- \qquad (III)$$

wherein $[M^{Unsatd}]$ represents monomer units having a pendent, free-radically polymerizable functional groups and subscript "o" is the parts by weight thereof;

$[M^{ester}]$ represents (meth)acrylate ester monomer units and subscript "p" represents the parts by weight thereof; and $[M^{polar}]$ represents polar monomer units and subscript "q" represents the parts by weight thereof.

Reactive oligomers (III) comprise one or more pendent groups that include free-radically polymerizable unsaturation, including (meth)acryloyl, (meth)acryloxy, propargyl, vinyl, allyl, acetylenyl, and (meth)acrylamide. That is, the monomer units $[M^{Unsatd}]$ contain such polymerizable groups.

An indirect method of incorporating pendent polymerizable unsaturated groups into the oligomers is to include a reactive functional group among the monomer units of the reactive oligomer that may be subsequently functionalized with an ethylenically-unsaturated compound having a functional group that is co-reactive with the functional group of the precursor oligomer.

Exemplary useful reactive functional groups FG include hydroxyl, amino, oxazolonyl, oxazolinyl, acetoacetyl, azlactonyl, carboxyl, isocyanato, epoxy, aziridinyl, acyl halide, and cyclic anhydride groups. Preferred among these are carboxyl, hydroxyl, amino, azlactonyl and aziridinyl groups. These pendent reactive functional groups FG are reacted with unsaturated compounds that comprise functional groups FG' that are co-reactive with the reactive pendent functional group (i.e., co-reactive groups). When the two functional groups react, an oligomer with pendent unsaturation results. In some applications, it may be desirable to use less than a stoichiometric equivalent of unsaturated compounds that comprise co-reactive functional groups, so that some of the pendent functional groups on the oligomer(s) remain unreacted. Specifically, the reactive oligomers of Formula III may be prepared from a precursor oligomer having monomer units of the formula $[M^{FG}]$, which monomer units have at least one reactive functional group FG that may be functionalized to provide the reactive oligomer of Formula III.

Exemplary reactive functional groups FG include hydroxyl, secondary amino, oxazolinyl, oxazolonyl, acetyl, acetonyl, carboxyl, isocyanato, epoxy, aziridinyl, acyl halide, vinyloxy, and cyclic anhydride groups. Selection of appropriate groups FG and FG' is within the capabilities of those skilled in the art. For example, if FG is an isocyanato group, then FG' preferably comprises a secondary amino or hydroxyl group. Likewise, if FG comprises a hydroxyl group, then FG' preferably comprises a carboxyl, ester, acyl halide, isocyanato, epoxy, anhydride, azlactonyl, or oxazolinyl group. And, if FG is a carboxy-functional group, the co-reactive functional group preferably comprises a hydroxyl, amino, epoxy, isocyanate, or oxazolinyl group.

Some preferred ethylenically-unsaturated compounds that may be used to functionalize the reactive oligomer have the general formula IV, below:

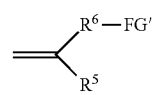

IV wherein $R^5$ is hydrogen, a $C_1$ to $C_4$ alkyl group, or a phenyl group, preferably hydrogen or a methyl group;

$R^6$ is a single bond or a divalent linking group that joins an ethylenically-unsaturated group to co-reactive functional group FG', and preferably contains up to 34, preferably up to 18, more preferably up to 10, carbon atoms and, optionally, oxygen and nitrogen atoms and, when $R^6$ is not a single bond, is preferably selected from

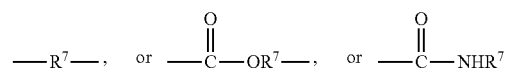

in which $R^7$ is an alkylene group having 1 to 6 carbon atoms, a 5- or 6-membered cycloalkylene group having 5 to 10 carbon atoms, or an alkylene-oxyalkylene in which each alkylene includes 1 to 6 carbon atoms or is a divalent aromatic group having 6 to 16 carbon atoms; and Representative examples of useful compounds of Formula IV having co-reactive functional groups include hydroxyalkyl (meth)acrylates such as 2-hydroxyethyl (meth)acrylate, 3-hydroxypropyl (meth)acrylate, 2,3-dihydroxypropyl (meth)acrylate, 4-hydroxybutyl (meth)acrylate and 2-(2-hydroxyethoxy)ethyl (meth)acrylate; aminoalkyl (meth)acrylates such as 3-aminopropyl (meth)acrylate and 4-aminostyrene; oxazolinyl compounds such as 2-ethenyl-1,3-oxazolin-5-one, 2-vinyl-4,4-dimethyl-1,3-oxazolin-5-one, 2-isopropenyl-4,4-dimethyl-1,3-oxazolin-5-one and 2-propenyl-4,4-dimethyl-1,3-oxazolin-5-one; carboxy-substituted compounds such as (meth)acrylic acid and 4-carboxybenzyl (meth)acrylate; isocyanato-substituted compounds such as isocyanatoethyl (meth)acrylate and 4-isocyanatocyclohexyl (meth)acrylate; epoxy-substituted compounds such as glycidyl (meth)acrylate; aziridinyl-substituted compounds such as N-acryloylaziridine and 1-(2-propenyl)-aziridine; and acryloyl halides such as (meth) acryloyl chloride.

The reactive oligomer may be redox polymerized per se, or with a multifunctional acrylate, such as hexanediol di(meth)acrylate. The reactive oligomer having pendent polymerizable groups may be prepared as described in U.S. Pat. No. 7,598,298 (Lewandowski et al.), U.S. Pat. No. 7,342,047 (Lewandowski et al.), and U.S. Pat. No. 7,074,839 (Fansler et al.)

The polymerizable reactive oligomer component may further comprise a diluent monomer. The (meth)acrylate-functional diluents, also referred to herein as "reactive diluents", are relatively low molecular weight mono- or di-functional, non-aromatic, (meth)acrylate monomers. These relatively low molecular weight reactive diluents are advantageously of a relatively low viscosity, e.g., less than about centipoise (cps) at 25° C. Difunctional, nonaromatic (meth)acrylates are generally preferred over monofunctional nonaromatic (meth)acrylates because difunctional nonaromatic (meth)acrylates allow for quicker cure time. Preferred reactive diluents include 1,6-hexanediol di(meth)acrylate, tripropylene glycol di(meth)acrylate, isobornyl (meth)acrylate, 2-(2-ethoxyethoxy)ethyl (meth)acrylate (available as SR 256 from Sartomer Company, Inc, of Exton, Pa.), N-vinylformamide, tetrahydrofurfuryl (meth)acrylate, polyethylene glycol di(meth)acrylate (available as SR 344 from Sartomer Co.), tripropylene glycol di(meth)acrylate, neopentyl glycol dialkoxy di(meth)acrylate, polyethylene glycol di(meth)acrylate, and combinations thereof.

In some embodiments, the polymerizable composition provides a structural and semi-structural adhesive composition in which the partially cured composition may be disposed between two substrates (or adherends), and subsequently fully cured to effect a structural or semi-structural bond between the substrates. "Semi-structural adhesives" are those cured adhesives that have an overlap shear strength of at least about 0.5 MPa, more preferably at least about 1.0 MPa, and most preferably at least about 1.5 MPa. Those cured adhesives having particularly high overlap shear strength, however, are referred to as structural adhesives. "Structural adhesives" are those cured adhesives that have an overlap shear strength of at least about 3.5 MPa, more preferably at least about 5 MPa, and most preferably at least about 7 MPa.

The first and second tacky latent adhesive layers are preferably dissolved in solvent to facilitate coating them onto the first and second major surfaces of the substrate, after which they are dried (e.g., in a forced air oven). Exemplary suitable solvents include ethers such as ethyl propyl ether, dipropyl ether, methyl t-butyl ether, di-t-butyl ether, glyme (i.e., 1,2-dimethoxyethane), diglyme, and diethylene glycol dimethyl ether; cyclic ethers such as tetrahydrofuran and dioxane; alkanes; cycloalkanes; aromatic solvents such as benzene, toluene, o-xylene, m-xylene, p-xylene; halogenated hydrocarbon solvents; acetonitrile; lactones such as butyrolactone and valerolactone; ketones such as acetone, methyl ethyl ketone, methyl isobutyl ketone, cyclopentanone, and cyclohexanone; sulfones such as tetramethylene sulfone, 3-methylsulfolane, 2,4-dimethylsulfolane, butadiene sulfone, methyl sulfone, ethyl sulfone, propyl sulfone, butyl sulfone, methyl vinyl sulfone, 2-(methylsulfonyl)ethanol, and 2,2'-sulfonyldiethanol; sulfoxides such as dimethyl sulfoxide; cyclic carbonates such as propylene carbonate, ethylene carbonate and vinylene carbonate; carboxylic acid esters such as ethyl acetate, methyl cellosolve and methyl formate; and other solvents such as methylene chloride, nitromethane, acetonitrile, glycol sulfite and 1,2-dimethoxyethane (glyme), combinations of such solvents, and supercritical solvents (such as $CO_2$).

The above-described compositions may be coated on a substrate using conventional coating techniques modified as appropriate to the particular substrate. For example, these compositions can be applied to a variety of solid substrates by methods such as roller coating, flow coating, dip coating, spin coating, spray coating, knife coating, and die coating.

Preferably, the monomer(s) and components of the redox initiator system are selected such that the rate of initiation is not less than 1,000 times (preferably not less than 100 times) slower than the rate of propagation and/or transfer of the generated radical group to the polymer radical. In the present application, "propagation" refers to the reaction of a polymer radical with a monomer to form a polymer-monomer adduct radical.

The first and second tacky latent adhesive layers may be irradiated with actinic electromagnetic radiation (e.g., ultraviolet or visible light) to remove the $R^{Photo}$ group thereby forming the reducing agent which initiates the redox cycle and polymerizes the polymerizable component(s) thereby building adhesion. UV light sources can be of two types: 1) relatively low light intensity sources such as, for example, germicidal low pressure mercury bulbs and blacklights which provide generally 10 milliwatts per square centimeter ($mW/cm^2$), and 2) relatively higher light intensity sources such as medium pressure mercury lamps which provide intensities generally greater than 500 $mW/cm^2$, preferably between 15 and 450 $mW/cm^2$. Where actinic electromagnetic radiation is used to fully or partially polymerize the polymerizable composition, high intensities and short exposure times are preferred. For example, an intensity of 600 $mW/cm^2$ and an exposure time of about 1 second may be used successfully. Intensities can range from about 0.1 to about 150 $mW/cm^2$, preferably from about 0.5 to about 100 $mW/cm^2$, and more preferably from about 0.5 to about 50 $mW/cm^2$. UV LEDs may also be used, such as a Clearstone UV LED lamp (385 nm, Clearstone Technologies Inc., Hopkins, Minn.). Other light sources such as, for example, lasers, flashlamps, and microwave driven lamps will also be apparent to those of skill in the art.

Polymerization/curing of the exposed tacky latent adhesive layers is preferably conducted at ambient temperature, but this is not a requirement. Curing should be conducted for a length of time sufficient to convert at least 10% (preferably at least 50%, more preferably at least 75% and most preferably at least 90%) of the monomer to polymer. Typically, the reaction time will be from several seconds to 5 days, preferably from 30 minutes to 3 days, and most preferably from 1 to 24 hours.

The substrate has first and second opposed major surfaces. It may be in the form of a tape or sheet, for example. The substrate may be flexible or inflexible, preferably flexible. Flexible substrates are defined herein as any material which is conventionally utilized as a tape backing or may be of any other flexible material. Examples include polymer films such as polypropylene, polyethylene, polyvinyl chloride, polyester (polyethylene terephthalate), polycarbonate, polymethyl (meth)acrylate (PMMA), cellulose acetate, cellulose triacetate, and ethyl cellulose. In some preferred embodiments, the substrate comprises an open or closed cell resilient foam backing. The thickness of the backing is preferably from micrometers to 5 millimeters, more preferably 25 micrometers to 2 millimeters, with larger thicknesses being more appropriate for foams, although this is not a requirement.

In some preferred embodiments, the substrate may be chosen so as to be transparent to the actinic electromagnetic radiation used to initiate the redox cycle. The coated article may then be initiated through the thickness of the transparent substrate.

In some embodiments, the first and/or second release liners are releasably adhered to the first and/or second respective tacky latent adhesive layers. Release liners are well-known in the adhesive art, and typically have low affinity for the composition to which they are adhered. Exemplary release liners can be prepared from paper (e.g., Kraft paper) or other types of polymeric material. Some release liners are coated with an outer layer of a release agent such as a silicone-containing material or a fluorocarbon-containing material. Release liners are widely available from commercial suppliers.

Adhesive articles according to the present disclosure can be used to securely bond two adherends together. Exemplary adherends include architectural surfaces, metals (e.g., automotive body parts), plastics, glass, wood, rubber, ceramic, and combinations thereof.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof.

Select Embodiments of the Present Disclosure

In a first embodiment, the present disclosure provides an adhesive article comprising:
a substrate having first and second opposed major surfaces;
first and second tacky latent adhesive layers disposed on the respective first and second opposed major surfaces of the substrate, wherein each of the first and second tacky latent adhesive layers independently comprises:
at least one polymerizable component, and
a redox initiator system comprising:
a transition metal complex that participates in a redox cycle;
an oxidizing agent; and
a blocked reducing agent represented by the formula

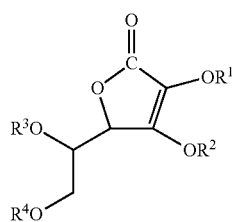

wherein
each of $R^1$ and $R^2$ are independently H, an alkyl, an aryl, or $R^{Photo}$, with the proviso that at least one of $R^1$ and $R^2$ is $R^{Photo}$;
$R^{Photo}$ represents a photoremovable group;
each of $R^3$ and $R^4$ independently represents H, an alkyl group, or an aryl group comprising a monovalent ester, ether, urethane, or carbonate group.

In a second embodiment, the present disclosure provides an adhesive article according to the first embodiment, wherein the substrate comprises an acrylic core.

In a third embodiment, the present disclosure provides an adhesive article according to the first or second embodiment, wherein the first and second tacky adhesive layers have the same composition.

In a fourth embodiment, further comprising a first release liner releasably adhered to the first tacky latent adhesive layer.

In a fifth embodiment, the present disclosure provides an adhesive article according to the fourth embodiment, wherein the second tacky latent adhesive layer is releasably adhered to the first release liner opposite the first tacky latent adhesive layer, and wherein the adhesive article comprises a roll.

In a sixth embodiment, the present disclosure provides an adhesive article according to the fourth embodiment, further comprising a second release liner releasably adhered to the second tacky latent adhesive layer.

In a seventh embodiment, the present disclosure provides an adhesive article according to any one of the third to sixth embodiments, wherein the photoremovable group $R^{Photo}$ is selected from phenacyl groups, 2-alkylphenacyl groups, ethylene-bridged phenacyl groups, p-hydroxyphenacyl groups, monovalent benzoin groups, o- or p-nitrobenzyl groups, o-nitro-2-phenethyloxycarbonyl groups, coumarin-4-yl-methyl groups, benzyl groups, o- or p-hydroxybenzyl groups, o- or p-hydroxynaphthyl groups, 2,5-dihydroxybenzyl groups, 9-phenylthioxanthyl groups, 9-phenylxanthyl groups, anthraquinon-2-yl groups, 8-halo-7-hydroxyquinoline-2-yl-methyl groups, and monovalent O,O-di(pivaloyl) ethylene glycol groups.

In an eighth embodiment, the present disclosure provides an adhesive article according to any one of the first to seventh embodiments, wherein the transition metal complex is represented by the formula:
$[ML_p]^{n+}A^-$, wherein M is a transition metal that participates in a redox cycle,
L is a ligand,
$A^-$ is an anion,
n is the formal charge on the transition metal having a whole number value of 1 to 7, preferably 1 to 3, and
p is the number of ligands on the transition metal having a number value of 1 to 9, preferably 1 to 2.

In a ninth embodiment, the present disclosure provides an adhesive article according to the eighth embodiment, wherein M is selected from Cu, Fe, Ru, Cr, Mo, Pd, Ni, Pt, Mn, Rh, Re, Co, V, Au, Nb, and Ag.

In a tenth embodiment, the present disclosure provides an adhesive article according to the eighth embodiment, wherein M is selected from copper, iron, cobalt and platinum.

In an eleventh embodiment, the present disclosure provides an adhesive article according to any one of the first to tenth embodiments, wherein the redox initiator system is present in the first tacky latent adhesive layer in an amount of 0.1 to 10 parts by weight, based on 100 parts by weight of the at least one polymerizable component.

In a twelfth embodiment, the present disclosure provides an adhesive article according to any one of the first to eleventh embodiments, further comprising a secondary reducing agent selected from tertiary amines, aromatic sulfinate salts, thioureas, and combinations thereof.

In a thirteenth embodiment, the present disclosure provides an adhesive article according to any one of the first to twelfth embodiments, wherein the oxidizing agent of the redox initiator system is selected from persulfuric acid and salts thereof; peroxides, transition metals, perboric acid and salts thereof, permanganic acid and salts thereof, perphosphoric acid and salts thereof, and combinations thereof.

In a fourteenth embodiment, the present disclosure provides an adhesive article according to any one of the first to thirteenth embodiments, comprising more than one oxidizing agent.

In a fifteenth embodiment, the present disclosure provides an adhesive article according to any one of the first to fourteenth embodiments, wherein the polymerizable component comprises components:
 a) 85 to 100 parts by weight of an (meth)acrylic acid ester;
 b) 0 to 15 parts by weight of an acid-functional ethylenically-unsaturated monomer;
 c) 0 to 10 parts by weight of a non-acid-functional, ethylenically-unsaturated polar monomer;
 d) 0 to 5 parts vinyl monomer;
 e) 0 to 5 parts of a multifunctional (meth)acrylate; and
 f) 0.1 to 10 parts by weight of the redox initiator system per 100 parts by weight of components a) to e).

In a sixteenth embodiment, the present disclosure provides an adhesive article according to the fifteenth embodiment, comprising 0.01 to 5 parts of the multifunctional (meth)acrylate.

In a seventeenth embodiment, the present disclosure provides an adhesive article according to any one of the first to sixteenth embodiments, wherein the first tacky latent adhesive layer further comprises an inorganic filler.

In an eighteenth embodiment, the present disclosure provides an adhesive article according to any one of the first to seventeenth embodiments, wherein the first tacky latent adhesive layer comprises at least one polymerizable vinyl monomer and the redox initiator system.

In a nineteenth embodiment, the present disclosure provides an adhesive article according to any one of the first to eighteenth embodiments, wherein the at least one polymerizable vinyl monomer is selected from vinyl ethers, vinyl esters, styrene, substituted styrene, vinyl halides, divinylbenzene, alkenes, isoprene, butadiene, and combinations thereof.

In a twentieth embodiment, the present disclosure provides an adhesive article according to any one of the eighth to nineteenth embodiments, wherein the mole ratio of the transition metal complex relative to oxidizing agent is from 1:1000 to 1:5.

In a twenty-first embodiment, the present disclosure provides an adhesive article according to any one of the first to twentieth embodiments, wherein the mole ratio of the oxidizing agent to blocked reducing agent is from 1:1.5 to 1.5:1.

In a twenty-second embodiment, the present disclosure provides an adhesive article according to any one of the first to twenty-first embodiments, wherein the oxidizing agent and blocked reducing agent are present in an amount of 0.01 to 10 parts by weight, based on the total weight of the at least one polymerizable component in the first tacky latent adhesive layer.

In a twenty-third embodiment, the present disclosure provides an adhesive article according to the twenty-second embodiment, wherein the at least one polymerizable component comprises components:
 a) up to 100 parts by weight of an (meth)acrylic acid ester;
 b) 0 to 15 parts by weight of an acid-functional ethylenically-unsaturated monomer;
 c) 0 to 15 parts by weight of a non-acid-functional, ethylenically-unsaturated polar monomer;
 d) 0 to 5 parts vinyl monomer;
 e) 0 to 100 parts of a multifunctional (meth)acrylate, per to 100 total parts of components a) to d); and
 f) the redox initiator system is present in amounts from 0.1 weight percent to 5.0 weight percent, per to 100 total parts of components a) to e).

In a twenty-fourth embodiment, the present disclosure provides an adhesive article according to the twenty-third embodiment, comprising greater than 50 parts by weight of the multifunctional (meth)acrylate, based on 100 parts total weight of components a) to d).

In a twenty-fifth embodiment, the present disclosure provides an adhesive article according to the twenty-third or twenty-fourth embodiment, further comprising 1 to 35 parts by weight of a toughening agent per 100 parts by weight of the at least one polymerizable component.

In a twenty-sixth embodiment, the present disclosure provides an adhesive article according to any one of the first to twenty-fifth embodiments, wherein at least one of $R^3$ and $R^4$ comprises a $C_{12}$-$C_{20}$ alkyl group.

In a twenty-seventh embodiment, the present disclosure provides an adhesive article according to any one of the eighth to twenty-sixth embodiments, wherein the transition metal complex comprises at least one of copper (II) naphthenate or copper (II) acetate.

In a twenty-eighth embodiment, the present disclosure provides an adhesive article according to any one of the twenty-second to twenty-seventh embodiments, wherein the polymerizable component comprises a reactive oligomer having pendent polymerizable groups.

In a twenty-ninth embodiment, the present disclosure provides an adhesive article according to the twenty-eighth embodiment, wherein the reactive oligomer comprises, based on the total of monomer units a) to e):
 a) greater than 50 parts by weight, preferably greater than 75 parts by weight, most preferably greater than 80 parts by weight of (meth)acrylate ester monomer units;
 b) 0.5 to 10 parts by weight, preferably 1 to 5 parts by weight, most preferably 1 to 3 parts by weight, of monomer units having at least one pendent free-radically polymerizable functional group; and
 c) 0 to 20 parts by weight of other polar monomer units.

In a thirtieth embodiment, the present disclosure provides a method of making an adhesive article, the method comprising:
 disposing first and second tacky latent adhesive layers on respective first and second opposed major surfaces of a substrate, wherein the first and second tacky latent adhesive layers independently comprise:
  at least one polymerizable component, and
  a redox initiator system comprising:
   a transition metal complex that participates in a redox cycle;
   an oxidizing agent; and
   a blocked reducing agent represented by the formula

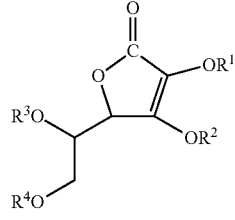

wherein
each of $R^1$ and $R^2$ are independently H, an alkyl, an aryl, or $R^{Photo}$, with the proviso that at least one of $R^1$ and $R^2$ is $R^{Photo}$;
$R^{Photo}$ represents a photoremovable group;
each of $R^3$ and $R^4$ independently represents H, an alkyl group, or an aryl group comprising a monovalent ester, ether, urethane, or carbonate group.

In a thirty-first embodiment, the present disclosure provides a method of using an adhesive article according to any one of the first to twenty-ninth embodiments, the method comprising:
exposing the first and second tacky latent adhesive layers to actinic electromagnetic radiation to provide exposed first and second tacky latent adhesive layers; and
contacting the exposed first and second tacky latent adhesive layer with a first adherend.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight. The following abbreviations are used throughout the Examples.

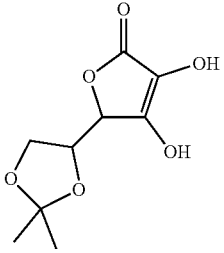

| ABBREVIATION | DESCRIPTION |
|---|---|
| TABLE OF ABBREVIATIONS | |
| CHP | Cumene hydroperoxide (80%, tech) from Alfa Aesar, Ward Hill, Massachusetts |
| AscIso | 5,6-O-isopropylidene-L-ascorbic acid |
| NBAscIso | 3-O-(2-nitrobenzyl)-5,6-O-isopropylidene-L-ascorbic acid |
| L-ascorbic acid | L-ascorbic acid from Alfa Aesar, Ward Hill, Massachusetts |
| 2,2-dimethoxypropane | 2,2-dimethoxypropane from Alfa Aesar |
| 10-camphorsulfonic acid | 10-camphorsulfonic acid from Sigma Aldrich, St. Louis, Missouri |
| THF | Tetrahydrofuran from EMD Millipore, Billerica, Massachusetts |
| DMSO | dimethyl sulfoxide from EMD Millipore |
| EtOAc | ethyl acetate from VWR International, Radnor, Pennsylvania |
| MEK | methyl ethyl ketone from Avantor Performance Materials, Center Valley, Pennsylvania |
| CN1964 | Urethane dimethacrylate oligomer from Sartomer Co., Exton, Pennsylvania |
| 2EHA | 2-ethylhexyl acrylate from BASF Corp., Florham Park, New Jersey |
| CHA | Cyclohexyl acrylate from TCI America, Portland, Oregon |
| BA | n-Butyl acrylate from BASF Corp. |
| Acm | Acrylamide from Zibo Xinye Chemical Company, Zibo, China |
| HPA | Hydroxypropyl acrylate (mixture of isomers) from BASF Corp. |
| Cu(OAc)$_2$ | Copper(II) acetate monohydrate from Alfa Aesar |
| glypho | Esterification product of 2-hydroxypropane-1,3-diyl-bis(2-methylprop-2-enoate) and 3-hydroxypropane-1,2-diyl-bis(2-methylprop-2-enoate) and diphosphorus pentoxide as described in EP dossier public record, EC number: 700-757-3 |
| VAZO-52 | 2,2'-azobis(2,4-dimethylpentatenitrile), thermal radical initiator obtained as VAZO 52 from E. I. du Pont de Nemours & Co., Wilmington, Delaware |

-continued

TABLE OF ABBREVIATIONS

| ABBREVIATION | DESCRIPTION |
|---|---|
| TDDM | Tertiary dodecyl mercaptan from Sartomer Co. |
| IEM | 2-isocyanatoethyl methacrylate from TCI America |
| RL1 | a siliconized polyester film release liner |
| 4950 VHB | Acrylic core bonding tape from 3M Company available as 3M VHB Tape 4950 |
| AFC | Acrylic non-frothed layer preparable according to the procedure in U.S. Pat. No. 4,895,745 (Vesley et al.), Example A, Tape 1-O |
| P94 | Tape primer available as Primer 94 from 3M Company |

Synthesis of Reactive Oligomer A

Reactive Oligomer A was prepared generally according to the following procedure. 2EHA (12 g), 50 g of CHA, 30 g of BA, 5 g of Acm, 3 g of HPA, 0.1 g of VAZO-52, 0.1 g of TDDM, and 100 g of EtOAc were added to a glass bottle. The contents were mixed and bubbled with nitrogen for 4 minutes before being sealed and placed in a Launder-Ometer rotating water bath for 24 hours at 60° C. After 24 hours the sample was analyzed using GPC to determine $M_w$ and polydispersity index. In a second step, 0.52 g IEM and 40 g MEK were added to the bottle. The bottle was sealed with polytetrafluoroethylene tape, and rolled on an IR-lamp-heated roller designed to reach a temperature of 60° C. for 24 h. The weight average molecular weight of the resulting polymer was approximately 298 kD as determined by conventional gel permeation chromatography (GPC) methods. The GPC instrumentation, which was obtained from Waters Corporation (Milford, Mass.), included a high pressure liquid chromatography pump (Model 1515HPLC), an autosampler (Model 717), a UV detector (Model 2487), and a refractive index detector (Model 2410). The chromatograph was equipped with two 5 micron PLgel MIXED-D columns, available from Varian Inc. (Palo Alto, Calif.). The final determination was made by reference to polystyrene standards.

Static Shear Test

In order to prepare static shear test samples one side of the PRB tape (prepared according to Example 1 (below) in which a photo-redox skin layer is laminated onto both sides of an acrylic non-frothed layer (AFC)) was exposed to UVA light from a microwave source (D-bulb, Model I6B, Fusion UV Systems, Inc., Gaithersburg, Md.) such that the sample received a total dosage of about 2100 mJ/cm$^2$ UVA, 670 mJ/cm$^2$ UVB, 100 mJ/cm$^2$ UVC, and 2800 mJ/cm$^2$ UVV light according to a PowerPuck II (EIT, Inc., Sterling, Va.). The UV light-exposed side of 1"x0.5" (2.5 cm×1.2 cm) piece of the tape was bonded onto a stainless steel piece having 2"×0.5" (5 cm×1.2 cm) dimensions. The non-bonded side of the PRB attached to the stainless steel piece was then exposed to UV radiation as mentioned above, and was laminated onto the test substrate of interest for the static shear tests. Prior to the testing the samples were kept at room temperature for 24 hours. The static shear performance was measured at 200° F. (93.3° C.) using 500 g, 750 g and 1000 g weights.

The static shear test was as follows: A strip of tape 1.27 cm in width and 2.54 cm long was adhered by its adhesive to a flat, rigid stainless steel or nylon panel with a 2.54 cm length of tape in contact with the panel. Before testing, a 1000-g weight was placed over the bonded area for 15 minutes. Then, the panel with the adhered tape was placed in an air-circulating oven which has been preheated to 200° F. (93.3° C.), and after 15 minutes a desired weight was hung from the free end of the stainless steel strip. The time at which the weight fell was reported as the measure of static shear test performance. If no failure, the test was discontinued at 10,000 minutes. Three replicates were tested for each condition.

Synthesis of 5,6-O-Isopropyudene-L-Ascorbic Acid (AscIso)

To a suspension of L-ascorbic acid (20.0 g, 114 mmol) in acetone (200 mL) was added 2,2-dimethoxypropane (20.4 g, 196 mmol) and 10-camphorsulfonic acid (1.32 g, 5.68 mmol). The resultant mixture was allowed to stir overnight at room temperature. To the resultant slurry was added approximately 0.6 g triethylamine. A portion of hexane was added to the mixture, and the white precipitate was collected via vacuum filtration, washing with additional hexane. The precipitate was dried under vacuum to afford 21.0 g of the desired product.

Synthesis of 3-O-(2-Nitrobenzyl)-5,6-O-Isopropylidene-L-Ascorbic Acid (NbAscIso)

Potassium carbonate (3.03 g, 21.9 mmol) was added to a solution of AscIso (4.73 g, 21.9 mmol) in 40 ml of 1:1 THF/DMSO. The resultant mixture was allowed to stir for 30 min. A solution of 2-nitrobenzyl bromide (4.73 g, 21.9 mmol) in 20 mL of 1:1 THF/DMSO was then added dropwise via addition funnel over 10 min. The resultant mixture was allowed to stir under nitrogen atmosphere overnight, during which time it became dark orange in color. Following removal of the THF under reduced pressure, approximately 200 mL of water was added to the mixture, which was then extracted with EtOAc (3×). The combined organic layers were washed with H$_2$O (3×) and saturated aqueous NaCl, dried over MgSO$_4$, filtered, and concentrated to a yellow solid. This material was purified via trituration with 2/1 hexane/EtOAc to afford 4.47 g of product as a pale yellow solid.

Preparation of Photo-Redox Skin Layer A

The components in Table 1 (below) were combined in a plastic cup and vigorously stirred by hand until homogeneous.

TABLE 1

| Reactive Oligomer A (40% solids in EtOAc/MEK), g | CN1964 | CHP, g | 10 wt % Cu(OAc)$_2$ in glypho, g | NBAscIso, g |
|---|---|---|---|---|
| 60 | 9.72 | 0.087 | 0.277 | 0.048 |

The resulting mixture was coated in handspread form on the RL1 liner at an 1-mil wet gap. The resulting handspreads were dried in a solvent oven at 70° C. for 30 minutes. The final thickness of the handspreads was 3.5 mil. These handspreads of Photo-Redox Skin Layer A were covered with RL1 release liner and used for lamination onto core material in Example 1.

Example 1

The photo-redox skin layer prepared as per the procedure mentioned hereinabove was laminated onto both sides of AFC to produce a tape designated as PRB tape. AFC was comparable to the core of 4950 VHB tape. The thickness of AFC was 40 mils (1.6 mm). The resulting tape assembly was then characterized for its static shear performance. Adhesion of the resultant assembly was compared to commercially available 4950 VHB tape from 3M Company, a high performance bonding tape with comparable core composition and adhesive layer thicknesses.

All the tests conducted on 4950 VHB tape involved priming the substrates with P94 by wiping twice with a tissue saturated with P94 and then drying P94 is a primer recommended for use with 4950 VHB tape. Prior to use stainless steel panels were wiped with a tissue saturated with ethyl acetate. The panels were allowed to dry. The panels were then washed with a tissue saturated with 50/50 IPA/water solution and allowed to dry. This was then followed by wiping the panels with a tissue soaked with acetone. The nylon substrate was wiped with a tissue soaked with 50/50 IPA/water solution.

Tables 2 and 3 report the performance of PRB tape with that of commercially available 4950 VHB tape. PRB tape has a cured PR adhesive on either side of the core layer while 4950 VHB tape has a typical lightly crosslinked PSA adhesive laminated on either side of the core layer. In Table 2, below, NA means "not applicable, test discontinued", 2B-FS means "mixture of 2B failure and cohesive core failure", 2B means "failure between the adhesive skin and the acrylic based core layer", and PO means "interfacial failure between the tape and the test substrate".

TABLE 2

| | PRB Tape | | | | | |
|---|---|---|---|---|---|---|
| Test Substrate | 500 g, min | Failure mode | 750 g, min | Failure mode | 1000 g, min | Failure mode |
| stainless steel | 10000+ | NA | 10000+ | NA | 10000+ | NA |
| | 10000+ | NA | 278 | 2B-FS | 10000+ | NA |
| | 10000+ | NA | 10000+ | NA | 10000+ | NA |
| Average | 10000+ | | 6759+ | | 10000+ | |
| nylon | 10000+ | NA | 10000+ | NA | 10000+ | NA |
| | 10000+ | NA | 10000+ | NA | 3720 | 2B-FS |
| | 10000+ | NA | 10000+ | NA | 10000+ | NA |
| Average | 10000+ | | 10000+ | | 7907+ | |

TABLE 3

| | 4950 VHB Tape + P94 | | | | | |
|---|---|---|---|---|---|---|
| Test Substrate | 500 g, min | Failure mode | 750 g, min | Failure mode | 1000 g, min | Failure mode |
| SS | 10000+ | NA | 313 | 2B | 91 | 2B |
| | 2567 | 2B | 326 | 2B | 107 | 2B |
| | 10000+ | NA | 273 | 2B | 101 | 2B |
| Average | 7522+ | | 304 | | 100 | |
| Nylon | 587 | PO | 37 | PO | 50 | PO |
| | 294 | PO | 167 | PO | 40 | PO |
| | 424 | PO | 83 | PO | 32 | PO |
| Average | 435 | | 96 | | 41 | |

PO failure mode represents interfacial failure between the tape and the test substrate, while 2B failure mode represents failure between the adhesive skin and the acrylic-based core layer. 2B-FS failure mode represents a mixture of 2B failure and cohesive core failure. As seen in Table 2, PRB tape showed considerably higher high-temperature static shear performance or dead-load carrying capability compared to the commercial 4950 VHB tape (Table 3).

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An adhesive article comprising:
   a substrate having first and second opposed major surfaces;
   first and second tacky latent adhesive layers disposed on the respective first and second opposed major surfaces of the substrate, wherein each of the first and second tacky latent adhesive layers independently comprises:
      at least one polymerizable component, and
      a redox initiator system comprising:
         a transition metal complex that participates in a redox cycle;
         an oxidizing agent; and
         a blocked reducing agent represented by the formula

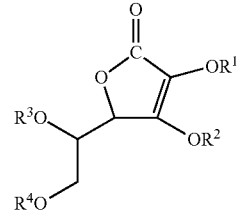

wherein
   each of $R^1$ and $R^2$ are independently H, an alkyl, an aryl, or $R^{Photo}$, with the proviso that at least one of $R^1$ and $R^2$ is $R^{Photo}$;
   $R^{Photo}$ represents a photoremovable group;
   each of $R^3$ and $R^4$ independently represents H, an alkyl group, or an aryl group comprising a monovalent ester, ether, urethane, or carbonate group.

2. The adhesive article of claim 1, wherein the substrate comprises an acrylic core.

3. The adhesive article of claim 1, wherein the first and second tacky adhesive layers have the same composition.

4. An adhesive article according to claim 1, further comprising a first release liner releasably adhered to the first tacky latent adhesive layer.

5. An adhesive article according to claim 4, wherein the second tacky latent adhesive layer is releasably adhered to the first release liner opposite the first tacky latent adhesive layer, and wherein the adhesive article comprises a roll.

6. An adhesive article according to claim 4, further comprising a second release liner releasably adhered to the second tacky latent adhesive layer.

7. The adhesive article of claim 1, wherein the photoremovable group $R^{Photo}$ is selected from phenacyl groups, 2-alkylphenacyl groups, ethylene-bridged phenacyl groups, p-hydroxyphenacyl groups, monovalent benzoin groups, o- or p-nitrobenzyl groups, o-nitro-2-phenethyloxycarbonyl groups, coumarin-4-yl-methyl groups, benzyl groups, o- or p-hydroxybenzyl groups, o- or p-hydroxynapthyl groups, 2,5-dihydroxybenzyl groups, 9-phenylthioxanthyl groups, 9-phenylxanthyl groups, anthraquinon-2-yl groups, 8-halo-7-hydroxyquinoline-2-yl-methyl groups, and monovalent O,O-di(pivaloyl) ethylene glycol groups.

8. The adhesive article of claim 1, wherein the transition metal complex is represented by the formula:
$[ML_p]^{n+}A^-$, wherein M is a transition metal that participates in a redox cycle,
L is a ligand,
$A^-$ is an anion,
n is the formal charge on the transition metal having a whole number value of 1 to 7, and
p is the number of ligands on the transition metal having a number value of 1 to 9.

9. The adhesive article of claim 8, wherein M is selected from Cu, Fe, Ru, Cr, Mo, Pd, Ni, Pt, Mn, Rh, Re, Co, V, Au, Nb, and Ag.

10. The adhesive article of claim 1, wherein the redox initiator system is present in the first tacky latent adhesive layer in an amount of 0.1 to 10 parts by weight, based on 100 parts by weight of the at least one polymerizable component.

11. The adhesive article of claim 1, further comprising a secondary reducing agent selected from tertiary amines, aromatic sulfinate salts, thioureas, and combinations thereof.

12. The adhesive article of claim 1, wherein the oxidizing agent of the redox initiator system is selected from persulfuric acid and salts thereof, peroxides, transition metals, perboric acid and salts thereof, permanganic acid and salts thereof, perphosphoric acid and salts thereof, and combinations thereof.

13. The adhesive article of claim 1, wherein the first tacky latent adhesive layer comprises at least one polymerizable vinyl monomer and the redox initiator system.

14. The adhesive article of claim 1, wherein the mole ratio of the oxidizing agent to blocked reducing agent is from 1:1.5 to 1.5:1.

15. The adhesive article of claim 1, wherein, in the first tacky latent adhesive layer, the oxidizing agent and blocked reducing agent are present in an amount of 0.01 to 10 parts by weight, based on the total weight of the at least one polymerizable component.

16. The adhesive article of claim 1, further comprising 1 to 35 parts by weight of a toughening agent per 100 parts by weight of the at least one polymerizable component.

17. The adhesive article of claim 1, wherein the polymerizable component comprises a reactive oligomer having pendent polymerizable groups.

18. The adhesive article of claim 17, wherein the reactive oligomer comprises, based on the total of monomer units a) to c):
   a) greater than 50 parts by weight of (meth)acrylate ester monomer units;
   b) 0.5 to 10 parts by weight of monomer units having at least one pendent free-radically polymerizable functional group; and
   c) 0 to 20 parts by weight of other polar monomer units.

19. A method of making an adhesive article, the method comprising:
   disposing first and second tacky latent adhesive layers on respective first and second opposed major surfaces of a substrate, wherein the first and second tacky latent adhesive layers independently comprise:
   at least one polymerizable component, and
   a redox initiator system comprising:
      a transition metal complex that participates in a redox cycle;
      an oxidizing agent; and
      a blocked reducing agent represented by the formula

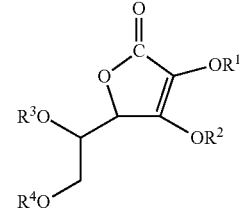

wherein
      each of $R^1$ and $R^2$ are independently H, an alkyl, an aryl, or $R^{Photo}$, with the proviso that at least one of $R^1$ and $R^2$ is $R^{Photo}$;
      $R^{Photo}$ represents a photoremovable group;
      each of $R^3$ and $R^4$ independently represents H, an alkyl group, or an aryl group comprising a monovalent ester, ether, urethane, or carbonate group.

20. A method of using the adhesive article of claim 1, the method comprising:
   exposing the first and second tacky latent adhesive layers to actinic electromagnetic radiation to provide exposed first and second tacky latent adhesive layers; and
   contacting the exposed first and second tacky latent adhesive layer with respective first and second adherends.

* * * * *